Dec. 6, 1932. G. P. LUCKEY Re. 18,681

SENSITIVE ALTIMETER

Original Filed June 27, 1923

INVENTOR.
GEORGE P. LUCKEY.
BY Stephen Berstvik.
ATTORNEY

Reissued Dec. 6, 1932

Re. 18,681

UNITED STATES PATENT OFFICE

GEORGE P. LUCKEY, OF LANCASTER, PENNSYLVANIA, ASSIGNOR TO PIONEER INSTRUMENT COMPANY, INCORPORATED, OF BROOKLYN, NEW YORK, A CORPORATION OF NEW YORK

SENSITIVE ALTIMETER

Original No. 1,749,494, dated March 4, 1930, Serial No. 648,057, filed June 27, 1923. Application for reissue filed March 16, 1931. Serial No. 523,093.

This invention relates to altimeters and has particular reference to an altimeter of extreme sensitivity and range for aeronautical use.

It is the prime object of this invention to provide an altimeter that will be rugged, compact, accurate and sensitive to the smallest change in altitude and which will be accurate over a great range of variation in altitude.

It is the further object to provide an instrument of this character, with a temperature compensating device which may be easily adjusted so as to simultaneously vary the effective length of a lever arm in two series of transmitting systems connected to two separate aneroid capsules.

Further objects will be more fully set forth in the attached specification and claims.

Figure 1:
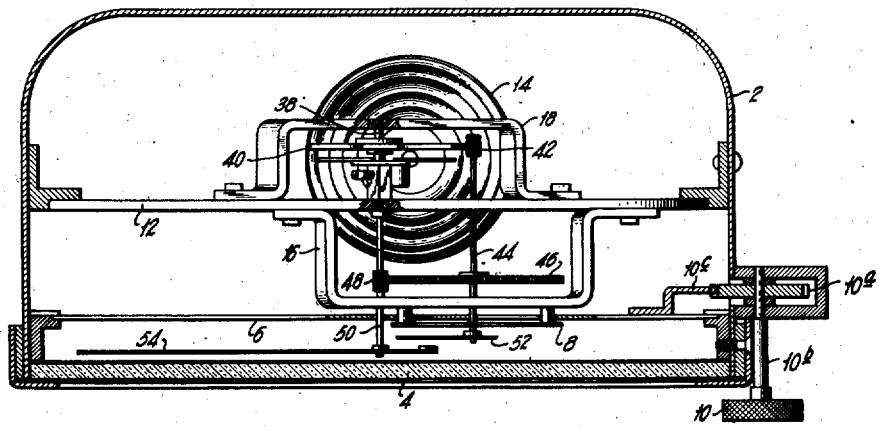
Fig. 1 is a sectional elevation of an embodiment of my invention.

Referring to the drawing, 2 is a bowl-shaped housing having a glass or other transparent top 4 and carrying the operating mechanism including dials 6 and 8 with zero adjusting mechanism 10 for the former. The zero adjusting mechanism includes a pinion 10*a* carried by a shaft 10*b* and meshing with a gear portion 10*c* secured to the dial 6 for causing relative movement between said dial and the pointers. In order that relative movement may be had between the dials 6 and 8 and/or between dials 6 and the indicators, the dial 8 may be secured to the yoke 16 in any well-known manner or to any other suitable support, and a sufficiently large opening provided in dial 6 in back of dial 8, as shown in Fig. 1, to afford clearance for the supporting means of the latter and for the counter-shaft 44 when the dial 6 is rotated. The purpose of the zero adjusting mechanism is to set or pre-set the altimeter so that it will indicate a desired reading such, for example, as zero when the altimeter is at a predetermined altitude or barometric pressure. Within the bowl 2 and secured to the same is a skeleton supporting disk 12 upon which two bellows or aneroid capsules 14 preferably of metal, are mounted, while supported from the disk 12 are yokes 16 and 18, upon which the levers, bearings and gear trains are mounted. To the inner ends of the capsules are rigidly secured in any suitable manner, projections 20, 22, pivoted to arcuate links 24 and 26 which in turn are pivotally connected with angularly adjustable arms 28, 30 guided by auxiliary arms 34 and 32, which are pivoted together at 36 on a shaft 38. The shaft 38 is mounted in jewelled bearings and provides a support for a counterbalanced segmental gear 40, positioning collars being provided therefor on the shaft. The segmental gear 40, meshes with a pinion 42, carried by a countershaft 44, which in turn carries a gear 46, meshing with a pinion 48, carried by a second countershaft 50. The countershafts 44 and 50, are also mounted in jewelled bearings and carry at their outer ends pointers 52 and 54 respectively, which are arranged to move over the faces of dials 8 and 6. The gear ratio between the gears 46 and 48 is properly chosen so that the desired number of revolutions of the hand 54 for one revolution of the hand 52 are obtained. The dials 6 and 8 are graduated in equal spaces, the first for example, being graduated for one thousand feet change in altitude per revolution, and the latter for any desired multiple of the one thousand feet change.

Figure 3:
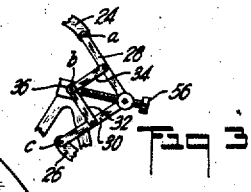
Fig. 3 is a detail of the link connections between the aneroid capsules.
Figure 2:
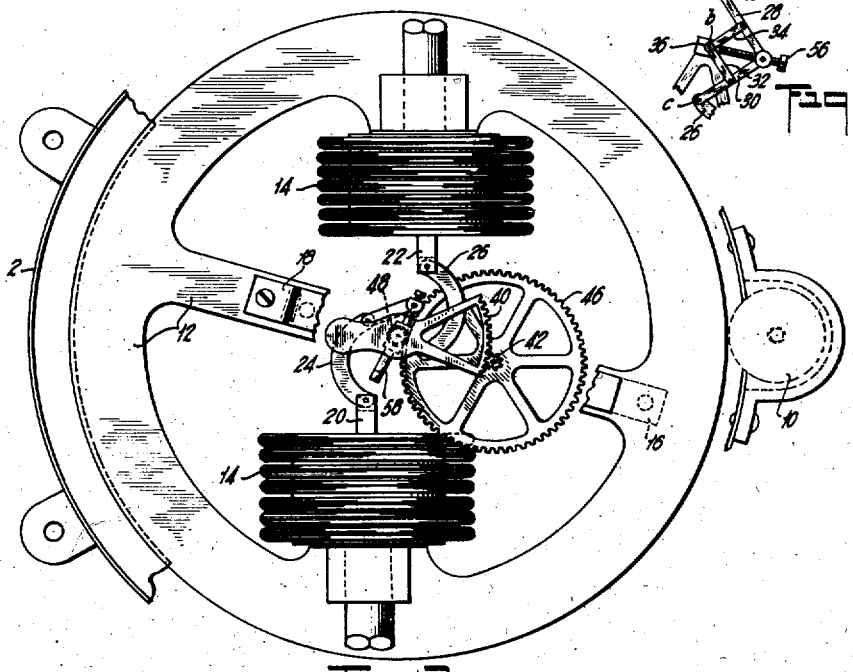
Fig. 2 is a top plan view.

Referring more particularly to Fig. 3, the links and arms connecting the projections 20 and 22 to the shaft 38, are especially designed to change the motion of the aneroid capsules for equal changes in pressure, into a uniform circular motion by a proper proportion of the lengths of the various arms and links, the distance between the aneroid connected ends of these arms and the pivot 36, the lateral spacing of the links 24 and 26, and the distance between the point 36 and the inner ends of the links 24 and 26. The non-uniform rectilinear motion of the capsules is changed into a uniform circular motion by this mechanism and the scales therefore contain equal graduations. This is absolutely necessary in an instrument in which two pointers are used wherein one pointer travels over the same scale a number of revolutions. If a square scale or other irregular scale was used, it would be impossible or at least extremely confusing, to obtain the reading of the pointer.

The ends of the links 24 and 26 are attached to the point 36 through an adjustable linkage 28, 34 and 30, 32. Calling the end of the link 24, *a*, the point 36, *b*, and the end of link 26, *c*, the distance *ab* is an imaginary link connecting 24 to 36, the length of which may be varied manually, if desired, in order to adjust the range of movement of the pointer. This may be necessary in case different aneroid capsules are used from those intended, or in case one is replaced in a finished instrument. By this means, also, it is possible to make the scales in quantities with the assurance that the instrument may be easily adjusted to accommodate itself to this scale. The arms or links 28 and 30, are attached together and to an adjusting screw 56. By adjusting this screw 56, lever arms *ab* and *bc* are simultaneously lengthened or shortened and to an equal degree. The projection 20 is substantially aligned with *a* in its normal position and the straight line *abc* as shown, is normally, at zero reading of the instrument, at such an angle to the line of motion of the projections 20 and 22 that decreasing lineal increments of motion of the projections 20 and 22 inward will produce equal arcuate increments of motion of the points *a* and *c* about axis 38. Since the total angular movement of the line *abc* is only about 30 degrees, the proper location of the line *abc* in relation to the line of motion of the projections 20 and 22 may be chosen so that the shaft 38 is rotated through substanially equal angles as the pressure of the outside air varies equal amounts, and as the bellows 14 expands in decreasing amounts which vary, like a spring, about as the square root of the changes of air pressure.

In order that compensation may be made for temperature changes, two links such as the links 28 and 30, or the links 32 and 34, or the adjusting screw 56 of the toggle adjusting mechanism, may be made of the material or combination of materials of suitable coefficients of thermal expansion. With such a construction the arms *ab* and *bc* may be automatically varied in a suitable manner by a temperature change of the atmosphere or of the instrument and which will correct errors introduced by the expansion of parts of the mechanism.

What I claim is:

1. In an instrument having sealed atmospheric pressure responsive means, a plurality of dials, an indicator for each of said dials, one of said indicators being geared to the other so as to move only a fraction of a revolution for each complete revolution of the other, link mechanism connecting said pressure responsive means to said indicators for transforming unequal movements of said means into uniform rotary movement of said indicators, and a device included in said mechanism for changing the ratio of the movement of the said indicators in respect to the movement of said pressure responsive means.

2. In an instrument having atmospheric pressure responsive means, a large and a small dial, a large and a small indicator adapted to register over said dials respectively, gearing interconnecting said indicators so that said small indicator moves a fraction of a revolution for each complete revolution of the larger indicator, and a system of pivotally connected links connecting said indicators to said pressure responsive means for transforming unequal movements of said pressure responsive means into uniform rotary movements of said indicators.

3. In an altitude indicator in combination, a plurality of spaced atmospheric pressure responsive bellows, a dial, a pointer adapted to register over said dial, link means between each of said bellows and said pointer for transferring movements of said bellows to said pointer, and a unitary adjusting means for said link means to simultaneously and equally vary the ratio of the movement of each of said bellows to the movement of the pointer.

4. In an altimeter having pressure-responsive means, a plurality of pointers adapted to be actuated thereby, said pointers being so arranged relative to each other that each is actuated to a different extent, a pair of dials for indicating the degree of actuation of said pointers, means connecting said pressure-responsive means to said pointers for transforming unequal movements of the former into uniform movements of the latter, said connecting means including adjustable means for changing the ratio of the movements of said pressure-responsive means to the movements of said pointers, and means for causing relative movement between one of the dials and the pointers for setting the altimeter so that a zero indication is obtained at a predetermined altitude.

5. In an instrument having pressure-responsive means adapted to be actuated lineally, a plurality of devices adapted to be rotatably actuated thereby, said devices being so arranged relative to each other that each is actuated to a different extent, means for indicating the degree of actuation of each of said devices, and means connecting said pressure-responsive means to said devices for transforming unequal linear movements of the former into uniform rotary movements of each of the latter, said connecting means including adjustable means for changing the ratio of the movements of said pressure-responsive means to the movements of said devices.

6. In an altitude indicator having atmospheric pressure-responsive means adapted to be actuated along a straight line, a pair of dials, a pair of indicators adapted to register over said dials, respectively, rotary means interconnecting said indicators so that one moves a fraction of a revolution for each complete revolution of the other, and a system of pivotally connected links connecting said indicators to said pressure-responsive means for transforming unequal linear movements of the latter into uniform rotary movements of each of the former.

7. In an altimeter having pressure-responsive means, a pair of dials, a pair of indicators adapted to register over said dials, respectively, gear means interconnecting said indicators so that one moves a fraction of a revolution for each complete revolution of the other, amplification mechanism connecting said gear means to said pressure-responsive means for transforming unequal movements of said pressure-responsive means into uniform rotary movements of each of said indicators, and adjusting means including a gear train and a knob operable from the front of the altimeter for causing relative movement between one of said dials and said indicators so that said dial will indicate a zero reading at a predetermined altitude or barometric pressure.

8. In an altimeter having sealed atmospheric pressure-responsive means, a plurality of dials, an indicator for each of said dials, a gear train interconnecting said indicators for causing one of them to move only a fraction of a revolution for a complete revolution of the other, a rock-shaft connected to said gear train and adapted to be actuated by the pressure-responsive means, link mechanism connecting said pressure-responsive means to said rock-shaft for transforming linear movements of said pressure-responsive means into rotary movements of each of said indicators, and adjusting means including a gear train and a knob operable from the front of the altimeter for causing relative movement between one of said dials and said indicators so that said dial will indicate a zero reading at a predetermined altitude or barometric pressure.

9. In an altimeter having atmospheric pressure-responsive means, a pair of dials, an indicator for each of said dials, a gear train interconnecting said indicators for causing one of them to move only a fraction of a revolution for a complete revolution of the other, means connected to said gear train and adapted to be actuated by the pressure-responsive means for transforming linear movements of said pressure-responsive means into rotary movements of said indicators, and adjusting means including a gear train and a knob operable from the front of the altimeter for actuating said last-mentioned gear train to cause relative movement between one of said dials and the indicators so that it will indicate zero at a predetermined altitude or barometric pressure.

In testimony whereof I have signed the foregoing specification.

GEORGE P. LUCKEY.